UNITED STATES PATENT OFFICE.

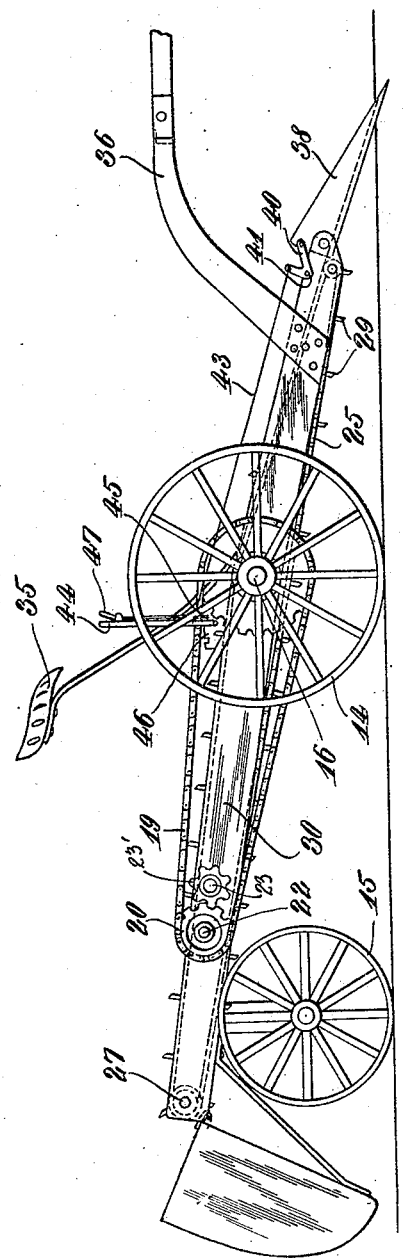

RUDOLF KANIA, OF VINDEX, MARYLAND, ASSIGNOR OF ONE-HALF TO ALEXANDER RYNKIEWICZ, OF VINDEX, MARYLAND.

AGRICULTURAL IMPLEMENT.

1,413,853.  Specification of Letters Patent.  Patented Apr. 25, 1922.

Application filed September 27, 1918. Serial No. 255,910.

*To all whom it may concern:*

Be it known that I, RUDOLF KANIA, a citizen of Russia, residing at Vindex, county of Garrett, and State of Maryland, have invented certain new and useful Improvements in Agricultural Implements, of which the following is a specification.

This invention relates to improvements in agricultural implements, and particularly to diggers, such as for instance potato diggers.

It is the principal object of the invention to provide an implement of this class with an improved shovel mounting for facilitating the operation of the shovel.

The invention further consists in certain novel details of construction for adjusting the shovel.

These and other like objects are attained by the novel construction and combination of parts hereafter described and shown in the accompanying drawings, forming a material part of this disclosure, and in which—

Figure 1 is a side elevational view of a harvesting machine made in accordance with the invention.

Figure 2 is a vertical sectional view of the same.

The apparatus is mounted upon a truck having front and rear wheels, respectively 14 and 15, the latter being of smaller diameter than the front wheels, and the front wheels are attached to an axle 16, upon which are secured, adjacent to the wheels, pairs of sprockets 18, over which run chains 19, similar but smaller sprockets 20 being arranged adjacent to the rear wheels 15, upon stub shafts 22. In front of these stub shafts, a shaft 23 is mounted carrying at its outer end sprocket wheels 23' and the shaft 23 is provided with a plurality of extending pins 24 which engage alternately with a conveyor 25 passing over rollers 26 and 27 respectively at the front and rear, so that the conveyor will move in a direction opposite to the movement of the sprocket chains 19.

A seat 35 is mounted on the frame substantially over the front axle, and engaged with the frame is a tongue 36 to which the team may be attached in the usual manner.

Extended from the front of the frame is a triangular scoop or shovel 38, held by pivotal connections 39 adjacent to the roller 26, and elevated or depressed by the bell-crank lever 40, pivoted on the rod 41, the rear elements of the bell-crank lever being engaged with a link 43, connecting with a lever 44, pivoted to the frame and having a detent 45 engageable with the toothed segment 46 attached to the frame, the detent being operable by the extending handle 47, convenient of access by a driver seated on the seat 35.

Thus the scoop may be raised or lowered manually to any desired degree so as to raise the vegetables from the earth and deposit the same upon the front end of the endless conveyors 25.

Having thus described my invention what I claim as new and desire to secure by Letters Patent, is—

In a device of the character described, comprising a frame, a shovel pivotally secured at its rear end to the front end of said frame, a bell crank lever journaled at the side of said frame and having one of its arms pivotally connected to said shovel, a hand lever, and a link connection secured to the other arm of said bell crank lever and to said hand lever, means for adjusting said shovel by means of said hand lever, and means for locking the parts in their adjusted positions.

In testimony whereof I have affixed my signature.

RUDOLF KANIA.